April 17, 1962 R. N. WALLACE 3,030,065
PLUG VALVE
Filed Oct. 9, 1958
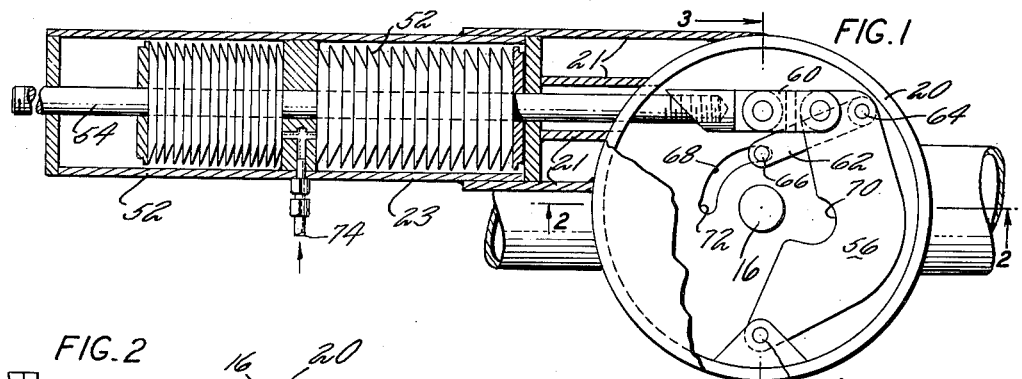
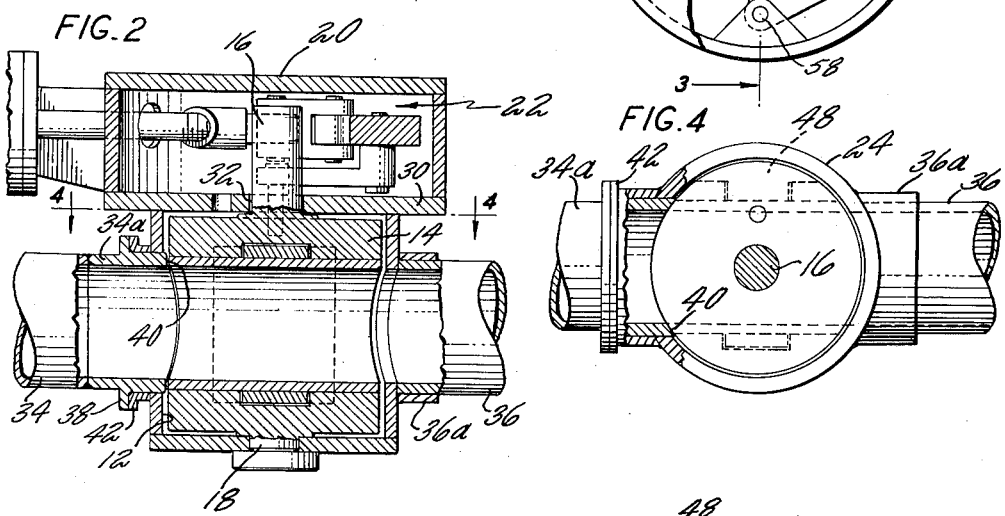
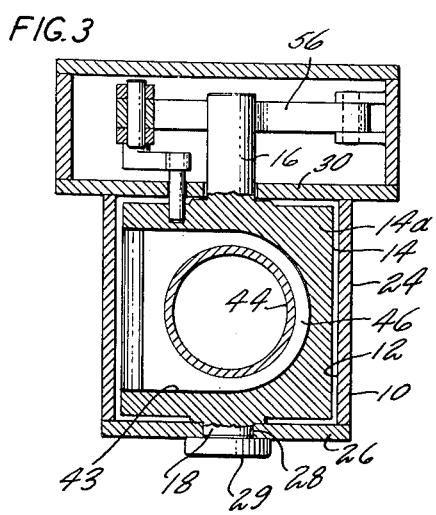
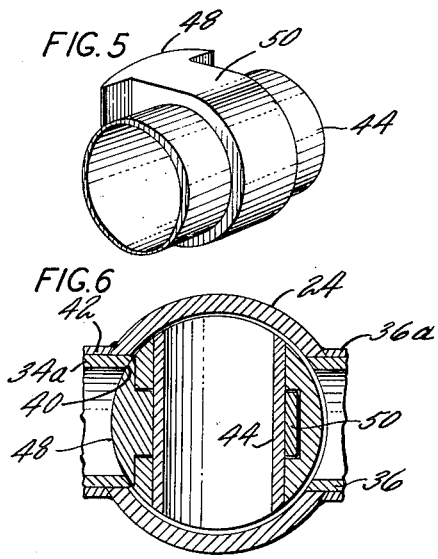
INVENTOR
RUDOLF N. WALLACE
BY M. B. Tasker
ATTORNEY

United States Patent Office 3,030,065
Patented Apr. 17, 1962

3,030,065
PLUG VALVE
Rudolf N. Wallace, Glastonbury, Conn., assignor to United Aircraft Corporation, East Hartford, Conn., a corporation of Delaware
Filed Oct. 9, 1958, Ser. No. 766,293
7 Claims. (Cl. 251—160)

This invention relates to plug-type valves and improved valve operating means for such valves.

Among the objects of this invention are the provision of a plug-type valve having practically zero pressure loss when open; the provision of a valve which produces, with an extremely simple valve structure, an improved sealing action as a result of compressive loads without sliding action of the valve parts or wearing of the sealing surfaces during valve operation; the provision of a valve having effective sealing without resort to fine fits or tolerances other than on the actual sealing surfaces; the provision of a valve having ample clearances at all other places except at the sealing surfaces, thus minimizing binding and wear due to distortion or entrapment of foreign bodies; the provision of a simple construction of housing and valve body with means for exact alignment of mating surfaces at valve closure; and the provision of a valve that is simple in operation requiring only 90° of rotation of the valve plug to open or close the valve and effect the forceful seating of the sealing surfaces in the closed position of the valve.

These and other objects and advantages of the invention will be evident or will be pointed out in connection with the following detailed description of one embodiment of the invention shown in the accompanying drawing.

In this drawing:

FIG. 1 is a side elevation of the valve embodying the invention in the valve open position with part of the casing broken away to show the valve actuating mechanism;

FIG. 2 is a sectional view taken on line 2—2 of FIG. 1;

FIG. 3 is a sectional view on line 3—3 of FIG. 1;

FIG. 4 is a sectional view on line 4—4 of FIG. 2;

FIG. 5 is a detail perspective view of the movable segment of the valve plug body and its bearing and supporting structure; and FIG. 6 is a sectional view through the valve in its closed position.

The valve consists essentially of a cylindrical housing 10 forming a cylindrical valve chamber 12 in which a cylindrical plug assembly 14 is rotatable on extensions, or shafts, 16 and 18 and a cylindrical casing 20 located at one end of housing 10 which houses the valve operating mechanism generally indicated at 22. Rigidly mounted on casing 20 as by welded members 21, is a third cylindrical casing 23 which houses a push-pull actuator having two bellows-type seals installed in series.

Housing 10 consists of a cylindrical wall 24 and a circular end wall 26 which has a round hole 28 concentric with cylindrical wall 24 in which shaft 18 of the plug assembly is loosely journaled. Hole 28 is closed by an external disc 29 which may be welded to the outer side of wall 26. The other end wall is formed by the side wall 30 of casing 20 which also has a round hole 32 therein aligned with hole 28, through which shaft 16 extends. Both shafts 16 and 18 are a loose fit in their respective bearing holes 28 and 32 for reasons which will become apparent as the description of the valve proceeds.

Cylindrical wall 24 of housing 10 has aligned inlet and outlet passages formed by pipes 34 and 36 which either project into or enclose suitable openings in the housing walls and are welded thereto. Pipe 36 encloses the opening in wall 24 and has an external collar 36a welded thereto which is shaped at one end to conform to the cylindrical wall 24 and is welded thereto. Pipe 34, as shown in FIG. 2, has the same inside diameter as pipe 36 and is welded to a short nipple 34a which is a machined part having an external flange 38. Nipple 34a projects into a suitable opening in wall 24 and is welded thereto and terminates in an accurately ground lip 40 which conforms to the inside cylindrical surface of chamber 12, but projects slightly into chamber 12 as shown in FIG. 2. An externally flanged collar 42 has its flange welded to flange 38 and has its other end shaped to conform to the external cylindrical surface of housing 24 to which it is welded.

Plug assembly 14 includes a cylindrical plug 14a which has a diametrical passage therethrough provided with a liner 44, the inside diameter of which is the same as the diameter of pipe 36, nipple 34a and pipe 34 so that a uniform diameter passage is provided through the valve and its inlet and outlet pipes. It will be noted that although chamber 12 and assembly 14 are both cylindrical, the assembly 14 is sufficiently smaller than the housing chamber to permit the plug assembly to rotate freely therein without frictional engagement between the two. In fact, any rubbing of the plug 14 against the walls of chamber 12 is prevented by providing a greater diametral clearance between 12 and 14 than between shafts 16 and 18 in their respective bearing holes 28 and 32.

The plug 14a has a U-shaped chamber 43 therein which faces at right angles to the axis of liner 44 (FIG. 3) and has a central rectangular groove 46 therein. A segmental valve face 48 fits loosely within chamber 43 and has a supporting and bearing projection, or web, 50 which is journaled on liner 44 and occupies groove 46 so that it turns with the plug assembly as the latter is rotated about the axis of shafts 16 and 18.

The plug assembly is rotated through an angle of 90° by any suitable valve operating mechanism (not shown) connected to the outer end of push-pull rod 54. The inner end of rod 54 is pivotally connected to one end of a lever 56 pivoted at its other end at 58. The connection between lever 56 and rod 54 is achieved by a link 60 pivoted at one end to rod 54 and at its other end to lever 56. By this arrangement lever 56 can move at its free end through an arc while rod 54 can be reciprocated in a straight line. A link 62 is pivoted at one end to lever 56 at 64 and at its free end carries a pin 66 which rides in a slot 68 in casing side wall 30. Pin 66 projects through side wall 30 and is secured in the body of plug 14a with the result that, as pin 66 moves from one end of slot 68 to the other, the plug assembly 14 will rotate 90° in one direction or the other.

As lever 56 moves about its fixed pivot 58 in the valve closing position, a semicircular notch 70 engages shaft 16 in the final closing movement of the lever and moves the shaft laterally a small distance. The end of slot 68 is slightly enlarged at 72 to permit the pin to move laterally an equal amount.

The valve and its operating mechanism are shown in valve open position in FIGS. 1–4. In this position of the plug assembly, a uniform diameter unobstructed passage is provided through the valve, as is particularly well shown in FIG. 2. As the push-pull rod 54 is moved to the left (FIG. 1) to swing lever 56 counterclockwise, and the pin 66 travels along the slot 68, plug assembly 14 is moved about the axis of shafts 16 and 18 through an angle of 90° into a position in which the valve face 48 is opposite lip 40 but out of contact therewith. In the final movement of lever 56 the notch 70 engages shaft 16 and moves the same laterally through the space provided by the loose fit of this shaft at 32 in cover 30 to urge the segment 48 laterally to seat surface 48a forcibly on lip 40. During this movement, shaft 18 pivots in its loose bearing 28 in housing end wall 26. It will be noted that the surface 48 is free to seat against lip 40 by reason of the freedom of movement of shafts 16 and 18, but also by the movement of support 50 about its journal on sleeve 44 which is at right angles to the axis of shafts 16 and 18. Thus there is a universal freedom of movement of segment 48, enabling it to seat accurately on lip 40 over the entire periphery of the latter. In FIG. 6, the plug assembly is shown following the lateral movement effected by the engagement of lever 56 with shaft 16. It will be noted that the segment 48 is seated on lip 40, all of the play between the plug 14a and the side walls of chamber 12 being on the side opposite lip 40. An inert gas, such as helium, is admitted at inlet 74 to the sealing bellows 52 under pressure sufficient to prevent leakage of the fluid being pumped from the pump casing.

It will be evident that as a result of this invention a plug-type valve has been provided having practically zero pressure loss when open, without frictional losses due to sliding action between the movable valve parts and the housing during closing and opening movements. Further, with a very simple valve structure an improved sealing action, as a result of compressive forces, has been provided without the necessity of fine fits and tolerances other than on the face 48a and lip 40, both of which are arcuate surfaces and hence easily ground. It will also be clear that the simplicity of the valve also extends to the valve operating mechanism which is capable of moving the valve plug assembly through its 90° travel and seating it firmly without resort to expensive and complicated mechanism.

While only one embodiment of the invention has been shown for purposes of illustration, it will be understood that various changes may be made in the construction and arrangement of the parts without exceeding the scope of the invention.

I claim:

1. A valve assembly comprising a body provided with inlet and outlet openings and a core having a passage therethrough mounted for rotation about a core shaft and subsequent lateral movement relative to said valve body between a closed position in which said passage is out of alignment with said openings and an open position in which it is aligned therewith and in which the core has a core actuating pin parallel with and spaced from the axis of rotation of the core, and an operating mechanism consisting of a lever pivoted at one of its ends on the valve body, an actuating member having a pivotal connection with said lever at a point spaced from the pivot for said lever, a link pivotally connected at one of its ends to said lever at a point remote from the pivoted end of the latter and connected at its other end with said core actuating pin, said shaft extending transversely of the plane in which said lever swings in position to be engaged by said lever and moved transversely in the final pivotal movement of the latter for moving said core laterally against the face of one of said openings in said valve body.

2. A valve assembly comprising a valve body provided with a chamber having inlet and outlet openings and a core having a passage therethrough and in which said core is mounted for rotation about a shaft loosely journalled in said body between a valve open position in which said passage is in register with said openings and a valve closed position in which said passage is out-of-register therewith, and in which said core has an actuating pin parallel with and spaced from said shaft by which it is moved between said positions said core also being free for limited lateral movement relative to said body in its valve closed position into covering relation relative to one of said openings, and an operating mechanism consisting of a lever pivoted at one of its ends on said body, an actuating member having a pivotal connection with said lever at a point spaced from the pivot for said lever for swinging the latter about its pivot, a link having one end pivoted to said lever at a point remote from the pivot of the latter and its other end pivoted to said pin said shaft extended through the plane in which said lever swings, said lever having a notch therein for centering said shaft and in the final swinging movement of said lever in a valve-closing direction moving said core laterally into covering relation over said one opening.

3. A valve assembly comprising a generally cylindrical valve core having a shaft about which it is rotatably mounted in a valve body having a cylindrical chamber provided with inlet and outlet openings in its side walls one of which comprises a valve seat, said core having a passage transverse the axis of said shaft which is movable between a valve open position in which it registers with said openings and a valve closed position in which it is out-of-register therewith, said core being loose in said chamber and having a segment which is free for rocking movement about an axis at right angles to the axis of rotation of said core and also having an operating pin parallel with and spaced from said shaft, and an operating mechanism consisting of a lever pivoted at one end on said body to swing in a plane at right angles to the axis of said shaft, an actuating member pivoted to said lever at a point remote from the pivot of the latter, an operating link pivoted to said lever at one end remote from the pivot of the latter and pivoted at its other end on said pin, said lever having centering means for engaging said shaft transversely of its axis of rotation and moving said shaft transversely of its axis of rotation as said segment lies opposite said seat.

4. In a plug valve, a housing having a cylindrical chamber, a plug assembly including a plug having extensions journalled in said housing on which it can turn freely in said chamber, said assembly also including a conduit extended through said plug transverse to its turning axis, one of said extensions having a loose journalled fit in said housing for permitting a lateral tilting movement of said plug assembly about its other extension, inlet and outlet passageways in said housing aligned with the conduit in said plug assembly in the open position of said valve, and means forming a closure for one of said passageways in the closed position of said assembly including a segment of said plug having a web journalled on said conduit for permitting said segment to rotate about the axis of said conduit upon said tilting movement of said plug assembly.

5. In a valve, a housing having a cylindrical chamber, a movable valve member cylindrical in shape having axial extensions journalled in said housing on which it can turn freely in said chamber between valve open and valve closed positions, opposed inlet and outlet passageways in the side walls of said chamber, a conduit extended diametrically through said movable valve member in alignment with said passageways in the valve open position of said member, said member having a segment thereof parted on a chord line parallel with the axis of said conduit, said member having a slot therein at right angles to the axis of said conduit across which said conduit extends, and a web in said slot journalled at one end on said conduit and carrying said segment at its other end.

6. In a valve, a housing having a cylindrical chamber, a cylindrical valve member having axial extensions journalled in said housing on which it can turn freely in said chamber between valve open and valve closed positions, diametrically opposed inlet and outlet passageways in said housing opening into said chamber, a conduit extended diametrically through said valve member transverse to its turning axis, a slot in said valve member at right angles to the axis of said conduit, and a web in said slot journalled at one end on said conduit and carrying at its other end a segment of said valve member, said segment being parted from said valve member on a chord line parallel with the axis of said conduit, said segment forming a closure for one of said passageways in the closed position of said valve member.

7. In a valve, a housing having a cylindrical chamber, a cylindrical valve member having axial extensions journalled in said housing on which it can turn freely in said chamber between valve open and valve closed positions, diametrically opposed inlet and outlet passageways in said housing opening into said chamber, a conduit extended diametrically through said valve member transverse to its turning axis, a slot in said valve member at right angles to the axis of said conduit, and a web in said slot journalled at one end on said conduit and carrying at its other end a segment of said valve member, said segment being parted from said valve member on a chord line parallel with the axis of said conduit, said segment forming a closure for one of said passageways in the closed position of said valve member, one of said extensions protruding from said housing and having a loose journalled fit in said housing, whereby said valve member can be moved laterally, utilizing its other extension as a pivot, to move said segment into pressure engagement over said one passageway, the tilting of said valve member being compensated for, in seating said segment, by pivoting of said web on said conduit.

References Cited in the file of this patent

UNITED STATES PATENTS

| | | |
|---|---|---|
| 1,927,855 | Swanson | Sept. 26, 1933 |
| 2,034,291 | Gannestad | Mar. 17, 1936 |
| 2,505,998 | Sleeper | May 2, 1950 |
| 2,559,695 | Allen | July 10, 1951 |
| 2,577,725 | Drake | Dec. 11, 1951 |
| 2,655,942 | Dougherty | Oct. 20, 1953 |
| 2,690,894 | Blevans | Oct. 5, 1954 |

FOREIGN PATENTS

| | | |
|---|---|---|
| 82,269 | Norway | Aug. 17, 1953 |